United States Patent
Adlfinger et al.

(10) Patent No.: US 12,381,425 B2
(45) Date of Patent: Aug. 5, 2025

(54) LAMINATED CORE SEGMENT AND METHOD FOR PRODUCING SAME

(71) Applicant: Flender GmbH, Bocholt (DE)

(72) Inventors: Helmut Adlfinger, Nuremberg (DE);
Andreas Lindmeier, Ruhstorf (DE);
Dominik Ratzisberger, Kösslarn (DE);
Andreas Jöckel, Nuremberg (DE);
Franz Xaver Michael Schober,
Neukirchen vorm Wald (DE)

(73) Assignee: Flender GmbH, Bocholt (DE)

(*) Notice: Subject to any disclaimer, the term of this patent is extended or adjusted under 35 U.S.C. 154(b) by 325 days.

(21) Appl. No.: 18/012,828

(22) PCT Filed: Jul. 8, 2021

(86) PCT No.: PCT/EP2021/069013
§ 371 (c)(1),
(2) Date: Dec. 23, 2022

(87) PCT Pub. No.: WO2022/008664
PCT Pub. Date: Jan. 13, 2022

(65) Prior Publication Data
US 2023/0283121 A1  Sep. 7, 2023

(30) Foreign Application Priority Data

Jul. 9, 2020 (EP) .................................. 20185020

(51) Int. Cl.
*H02K 1/16* (2006.01)
*H02K 7/18* (2006.01)
*H02K 15/021* (2025.01)

(52) U.S. Cl.
CPC ............. *H02K 1/16* (2013.01); *H02K 15/021* (2025.01); *H02K 7/1838* (2013.01)

(58) Field of Classification Search
CPC ....... H02K 1/16; H02K 15/021; H02K 7/1838
See application file for complete search history.

(56) References Cited

U.S. PATENT DOCUMENTS

| 2005/0073210 | A1 | 4/2005 | Rocky et al. |
| 2007/0096587 | A1* | 5/2007 | Ionel ............... H02K 1/148 310/180 |
| 2014/0250681 | A1* | 9/2014 | Johnston ........... H02K 15/026 29/602.1 |
| 2015/0244222 | A1* | 8/2015 | Scuotto ............ H02K 3/18 310/201 |

(Continued)

FOREIGN PATENT DOCUMENTS

| DE | 2629532 | 1/1977 |
| DE | 2844743 | 4/1980 |

(Continued)

OTHER PUBLICATIONS

International Search Report issued by the European Patent Office in International Application PCT/EP2021/069013 on Aug. 18, 2021.

*Primary Examiner* — Forrest M Phillips
(74) *Attorney, Agent, or Firm* — Henry M. Feiereisen LLC

(57) ABSTRACT

A laminated-core segment includes a plurality of axially layered metal sheets. Each metal sheet includes a yoke having grooves, teeth, and a yoke rear which connects the teeth, with at least some of the teeth having axially aligned recesses on a groove distal side of the metal sheet.

20 Claims, 4 Drawing Sheets

(56) References Cited

U.S. PATENT DOCUMENTS

| | | | | |
|---|---|---|---|---|
| 2017/0237320 A1* | 8/2017 | Urabe | ............... | H02K 15/021 |
| | | | | 29/596 |
| 2021/0091611 A1* | 3/2021 | Volbers | ................ | H02K 3/18 |
| 2021/0328484 A1* | 10/2021 | Bäcker | ................ | H02K 1/02 |
| 2021/0408847 A1* | 12/2021 | Röer | ................ | H02K 1/185 |
| 2024/0213839 A1* | 6/2024 | Vogt | ................ | H02K 3/24 |

FOREIGN PATENT DOCUMENTS

| | | | | |
|---|---|---|---|---|
| DE | 202005003518 | | 6/2005 | |
| DE | 102010031105 | | 1/2012 | |
| DE | 112014007129 T5 * | | 12/2017 | ............ H02K 1/148 |
| EP | 1467470 | | 10/2004 | |
| EP | 1780869 | | 5/2007 | |
| EP | 3595147 A1 * | | 1/2020 | ............ G01H 1/006 |
| GB | 2108772 | | 5/1983 | |
| WO | WO 2007/145471 | | 12/2007 | |

* cited by examiner

LAMINATED CORE SEGMENT AND METHOD FOR PRODUCING SAME

CROSS-REFERENCES TO RELATED APPLICATIONS

This application is the U.S. National Stage of International Application No. PCT/EP2021/069013, filed Jul. 8, 2021, which designated the United States and has been published as International Publication No. WO 2022/008664 A1 and which claims the priority of European Patent Application, Serial No. 20185020.3, filed Jul. 9, 2020, pursuant to 35 U.S.C. 119 (a)-(d).

BACKGROUND OF THE INVENTION

The invention relates to a laminated-core segment of a dynamo-electric rotary machine, to a dynamo-electric rotary machine having such laminated-core segments, and to a method for producing such laminated-core segments.

Normally, stator windings of motors and generators in the form of coils are introduced into grooved metal sheets which are pre-punched for this purpose. Depending on the size of the machine, it is necessary for these stator metal sheets to be segmented (divided) here in a circumferential direction, since electrical metal sheets are produced by the rolling mills only with a limited width.

In order to reduce the amount of waste, that is to say the sheet-metal scrap, laminated cores constructed in a spiral-shaped manner are known from the documents US 2005/073210 A1 and DE 10 2010 031 105 A1. A disadvantage here is that partial arching of the metal sheets, which makes proper stacking more difficult, occurs.

DE 26 29 532 A1 has disclosed a laminated-core segment for a stator of an electric machine that is assembled from metal sheets with trapezoidal teeth for windings, wherein the metal sheets have a multiplicity of notches on a rear side, which faces away from the windings.

EP 1 780 869 A2 and EP 1 467 470 A2 have each disclosed a laminated-core segment for a stator of an electric machine that is assembled from metal sheets with trapezoidal teeth for windings, wherein the teeth have tangentially projecting ribs on their free end and the metal sheets have cutouts on a rear side, which faces away from the windings.

Taking this as a starting point, the invention is based on the object of further reducing the sheet metal offcuts in segmented rotary machines in a simple manner. The intention is for the efficiency of the production and the machine to be increased in this case.

SUMMARY OF THE INVENTION

The object is achieved by a laminated-core segment as set forth hereinafter, and by a method as set forth hereinafter. Preferred configurations of the invention are given in the dependent claims and the description below, which may constitute an aspect of the invention individually or in combination. A description of a feature together with another feature is given only for reasons of simplified Illustration and is not intended to exclude the possibility of the respective feature constituting a refinement of the invention without the other feature too.

The object set is achieved by a laminated-core segment composed of axially layered metal sheets, wherein each metal sheet has a yoke with grooves and with teeth, wherein the teeth are connected by a yoke rear, and wherein at least some teeth have axially aligned recesses on that side of the metal sheets which faces away from the grooves.

The object set is also achieved by a dynamo-electric rotary machine, in particular having a large diameter, wherein a stator and/or a rotor are constructed in a segmented manner in the circumferential direction, wherein at least the stator has laminated-core segments according to the invention that are arranged in the circumferential direction, wherein in particular the laminated-core segments delimit an air gap with a defined curvature.

The object set is also achieved by a method for producing a laminated-core segment according to the invention by the following steps:

individually separating, in particular punching out or lasering out, metal sheets from a sheet-metal coil with a predefined width, wherein the metal sheets have a yoke with grooves and with teeth, wherein the teeth are connected by a yoke rear, and wherein recesses extending in a longitudinal extent are provided on the yoke rear in the region of at least some teeth on that side of the metal sheets which faces away from the grooves, wherein the delimiting edge of the yoke rear is perpendicular to the longitudinal extent of the sheet-metal coil, stacking the metal sheets to form a laminated-core segment hi such a way that axially aligned recesses of the laminated-core segment are obtained, so that a curvature of an air gap of the electric machine can be set, wherein in particular the laminated-core segment according to the invention is obtained.

The laminated-core segments may be assembled to form a dynamo-electric rotary machine according to the invention.

The metal sheets for a laminated-core segment are punched or lasered no longer in the shape of part of a circle, but with a straight shape. In this case, for rotary machines with external rotor or internal rotor, material is removed from the yoke region accordingly in a targeted manner for bending at a later stage, in order to avoid to the greatest extent partial arching of the metal sheets during the bending.

In other words, the delimiting edges of the yoke rears are perpendicular to the longitudinal extent of the sheet-metal coil. Furthermore, the yoke rear has recesses, that is to say places where material has been removed, which permit bending of the metal sheets without the metal sheets arching during the bending. In the case of this purely plastic deformation, material flows into different thicknesses of the metal sheets.

A stator of an electric machine may be assembled by way of a plurality of laminated-core segments, wherein the respective laminated-core segment extends for example over a circumferential-angle range of substantially 90°, substantially 72°, substantially 45°, substantially 40°, substantially 36° or even less. If a clearance fit or a gap is intended to be provided between the circumferentially successive laminated-core segments, the circumferential-angle range may also be provided to be smaller by 0.5° to 1.0°.

After the the metal sheet intended for the laminated-core segment has been individually separated, in particular by punching-out or lasering-out, from the sheet-metal coil, the metal sheet has a substantially rectangular basic shape, from which the grooves for the respective yoke have been cut out on one long side and the in particular substantially slot-shaped recesses have been cut out on the other long side. The long sides may be connected to one another via short sides extending perpendicularly to the long sides. For producing the laminated-core segment, the metal sheet can be bent plastically and/or elastically in its metal-sheet plane in order for the curvature of the air gap of the electric machine to be set. In the case of an external-rotor machine, provision may be made of the long side with the grooves radially at the outside and of the long side with the recesses radially at the inside, while the converse may be true in the case of an internal-rotor machine. The short sides point substantially in a tangential direction.

Preferably, for the purpose of providing a curvature of an air gap of an electric machine, edges of the recess that delimit the recess and face toward one another are bent toward one another, wherein the curvature is provided solely by way of plastic deformation of the metal sheet. The recesses make possible provision of a sufficiently large clearance for edges delimiting the respective recess, which extend away from the long side, to bend toward one another. Basically, it is possible for the edges to be forced toward one another by way of an elastic pre-tension, wherein particularly desired curvature is maintained by a suitable holding and/or fastening technique during the stacking of the metal sheets to form the laminated-core segment. Preferably, the curvature is provided solely by way of a plastic deformation of the metal sheet. For this purpose, a gap width of the respective recess may be selected to be larger than that required for the intended curvature, so that, when the sheet metal is bent, the edges of the respective recess come into contact with one another and, around their elastic deformation component, can spring back to a relative position with respect to one another that corresponds to the desired curvature, in this way, the curvature is achieved solely by plastic deformation of the sheet metal, so that it is not necessary for the desired shape of the metal sheets to be secured against elastic springing-back into an undesired shape. In this way, the production and assembly of the laminated-core segment is simplified.

Preferably, the grooves and/or the teeth, which are formed in particular between the grooves, are of substantially rectangular form. Particularly preferably, the grooves and teeth have the same width. In this case, the width is measured along the longitudinal direction of the metal sheet, which corresponds to the tangential direction in the bent state. In this way, it is possible for two metal sheets individually separated from the sheet-metal coil whose grooves and teeth face toward one another, wherein the teeth of one metal sheet engage into the grooves of the other metal sheet, to be separated from one another in a common plane by way of a relative movement along the longitudinal extent of the grooves and teeth, which longitudinal extent corresponds to the radial direction in the bent state of the metal sheets. For example, the individually separated meta/sheets may be conveyed away from an individual-separation point along a conveying direction via conveying elements, for example driven conveyor belts and/or rollers, wherein a conveying element following in the conveying direction provides a higher conveying speed and can consequently separate from one another the metal sheets which engage with their teeth and grooves one into the other. In this way, the production process is simplified.

It is particularly preferably provided that, after the individual separation, the metal sheets arranged in a common plane are spaced apart from one another by way of a relative movement within the common plane, in particular along a longitudinal direction of the grooves and/or teeth.

Preferably, the respective recess is provided with the respectively assigned tooth in a common circumferential-angle range. Preferably, with respect to the circumferential angle, the recess is positioned centrally in relation to the respective assigned tooth. Particularly preferably, the number of recesses corresponds to the number of grooves and/or to the number of teeth of the metal sheet. The directional indication "circumferential direction" relates in this case to the bent state of the metal sheets, by way of which bent state the desired curvature is set.

In particular, end-side teeth delimited by a respective short side of the metal sheet have, in comparison with the remaining teeth, a smaller width $b_E$ than the average width $b$ of the remaining teeth in the circumferential direction, wherein $45\% \leq b_E/b \leq 50\%$ and preferably $47\% \leq b_E/b \leq 49\%$. The teeth may have a substantially constant width in the circumferential direction, wherein end-side teeth delimited by the respective short side of the metal sheet have, in comparison with the remaining teeth, only substantially half the width, and/or a width that is slightly smaller than half the width, in the circumferential direction. In the case of a width of the end-side teeth that is slightly smaller than half the width of the remaining teeth, a gap may be provided between circumferentially successive laminated-core segments. In this way, the fitting of the laminated-core segments is simplified and the provision of a proportionate recess in the respective short side is saved, whereby the punching waste can be further minimized.

The invention may be used for stators and rotors in segmented design.

The invention may also be used in internal-rotor and external-rotor machines. Whereas, in the case of an internal-rotor machine, the stator the recesses open during the bending process, in the case of an external-rotor machine, the recesses, in particular with corresponding material removal, are almost closed.

A further advantage is that the rolling direction is ideally parallel to the groove/tooth direction, which, in particular in the case of a grain-oriented electrical metal sheet, keeps the permeability in the rolling direction completely 100% in the tooth direction and thus optimizes the flux guidance and increases the machine efficiency.

The provision according to the invention of the metal sheets results in improved, that is to say more compact, stacking of the metal sheets or sheet-metal segments being achieved.

In particular, it is now possible for straight metal sheets, for a suitable groove-width/tooth-width ratio, to be arranged, ideally, in an interengaging manner on the sheet-metal coil, which significantly reduces the amount of sheet-metal offcuts.

Different bending radii are to be provided according to radius of stator or rotor, it being necessary in this case to adjust between the required recesses with regard to shape (rectangular, wedge-shaped, trapezoidal) and the depth in the yoke rears.

BRIEF DESCRIPTION OF THE DRAWING

The invention and further configurations of the invention will be discussed in more detail on the basis of schematically illustrated exemplary embodiments: in the figures.

DETAILED DESCRIPTION OF PREFERRED EMBODIMENTS

Figure 1:
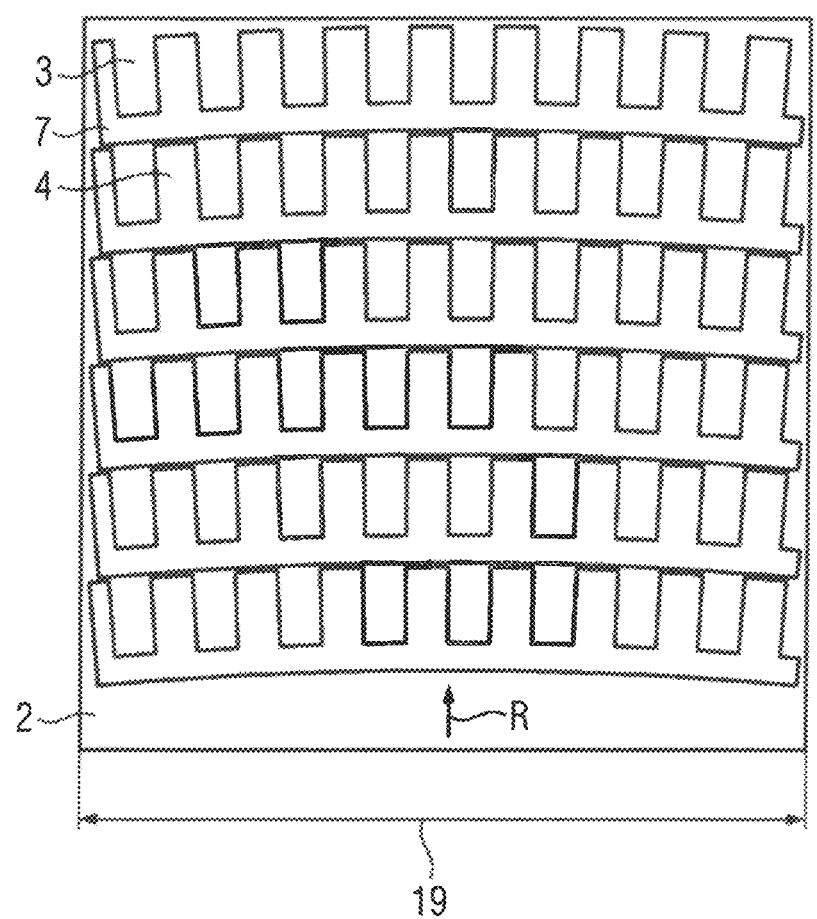
FIG. 1 shows prior art in respect of punching processes.

Metal sheets 1 or sheet-metal segments of stators 9 and/or rotors 8 of large dynamo-electric machines, such as generators 12 of wind turbines, are preferably dimensioned such that the maximum width 19 of a sheet-metal coil 2 is used. However, it is possible to arrange said metal sheets 1, as per FIG. 1, only one below the other or next to one another onto the sheet-metal coil 2.

FIG. 1 shows a sheet-metal coil 2 which has the shape of part of a circle of radius R. The sheet-metal coil 2 has a width 19 which is predefined by the rolling mills. As a result of the predefined punching pattern or lasering pattern of a predefined sheet-metal section, a relatively large amount of sheet-metal waste consequently occurs.

The individual metal sheets 1, which form a yoke 6, have teeth 4 which are spaced apart by grooves 3. The teeth 4 of a metal sheet 1 are connected by a yoke rear 7.

The metal sheets 1 have been punched in the shape of part of a circle of radius R. The punched-out grooves 3 and the intermediate regions of neighboring metal sheets 1 are in this case pure offcuts, which have to be scrapped. There are consequently offcut ratios of up to 50% in some cases.

Figure 2:
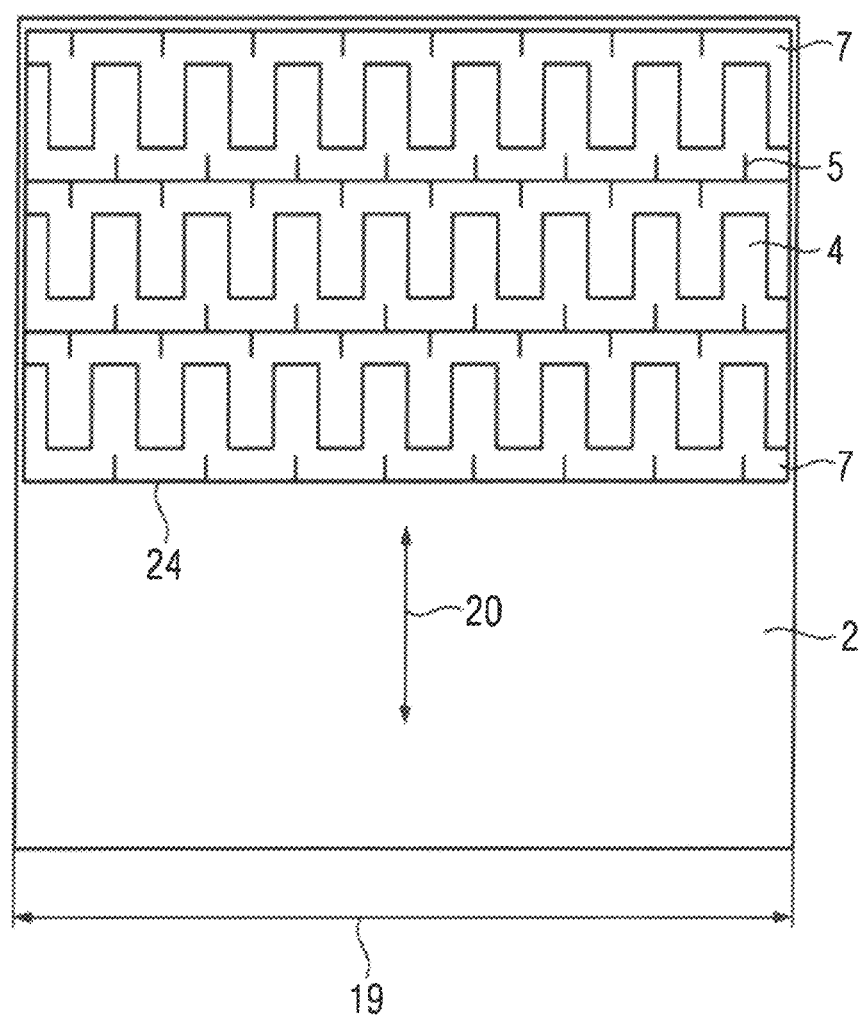
FIG. 2 shows punching according to the invention.

FIG. 2 then shows the type of processing of a sheet-metal coil 2, that is present, according to the invention. In this case, the delimiting edge 24 of the yoke rear 7 is arranged perpendicularly to a rolling direction 20 of the metal sheet 1, This, in particular ideally, makes it possible, according to the widths of the grooves 3 and teeth 4, for these to be arranged in a nested manner and for the sheet-metal waste to thus be reduced. In order, however, to now design laminated-core segments 11 of a dynamo-electric rotary machine without metal sheets 1 partially arching during bending and thus making stacking more difficult, additionally, in the rolling direction 20, recesses 5 have been formed in the yoke rear 7 by punching or lasering. In this way, a bending process results in a laminated-core segment 11 of a stator 9 or of a rotor 8 being obtained. Said recesses 5 are arranged in particular in the region of the teeth 4, wherein the shape thereof as well as the depth thereof in the rolling direction 20 are predefined by the later bending radius R. The groove teeth of a straight metal sheet, which are parallel to one another, are in this case all oriented in the direct rolling direction 20.

A further advantage is that the rolling direction 20 of the metal sheets 1 is now ideally parallel to the groove/tooth direction, which, in particular in the case of a grain-oriented electrical metal sheet, keeps the permeability in the rolling direction completely 100% in the tooth direction and thus optimizes the flux guidance. This increases the efficiency of the dynamo-electric machine.

Basically, the specific metal-sheet radius constitutes the actual problem in this case. In a design with a straight punching or lasering contour, the metal sheets 1 can be pushed together to within a few millimeters and, for a suitable groove/tooth relationship, even one into the other. In this way, the sheet-metal waste is reduced to a minimum. Sheet-metal offcuts that occur have to be paid for too, the total use of sheet material thus being very high. This optimization according to the invention therefore has a considerable effect on the product material costs, since electrical sheet metal is one of the major cost drivers of electric machines.

A further advantage is that the rolling direction 20 is ideally parallel to the groove/tooth direction, which, in particular in the case of a grain-oriented electrical metal sheet, keeps the permeability in the rolling direction completely 100% in the tooth direction and thus optimizes the flux guidance. This result in an ideal orientation of each individual tooth 4 and each groove 3, which leads to the improved flux guidance.

The formation of a recess 5 or a "keyhole notch" in the yoke rear 7 ensures targeted bending with a predefined radius R in the yoke region. Pre-bending by means of bending devices prior to coating of a laminated-core segment 11 or bending during the coating process for the metal sheets of the laminated-core segment 11 are in this case conceivable.

The teeth 4 of a straight metal sheet, which are oriented parallel to one another, are in this case all oriented in the direct rolling direction. The subsequent bending results in the teeth 4 of a stator 9 being spread apart, and the recesses 5 being closed, in the case of an external-rotor machine, Correspondingly, the teeth 4 of a stator 9 are bent in such a way that the recesses 5 are opened in the case of an internal-rotor machine.

Figure 3:
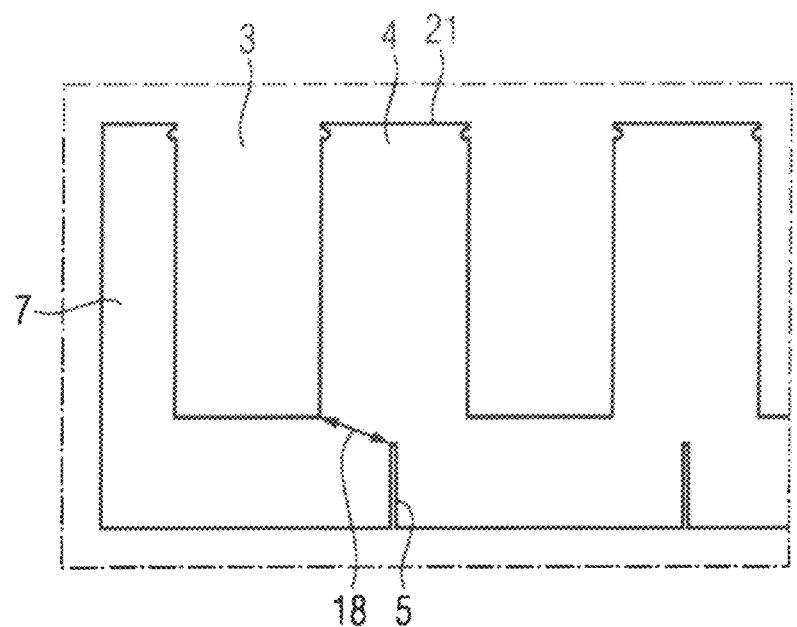
FIG. 3 shows a detail view of a metal sheet.

FIG. 3 shows in a detail view a detail of a metal sheet 1, In this case, the recesses 5 are arranged as a slot in the region of the yoke rear 7 of the teeth 4. This has the advantage that a sufficient web thickness 18 is provided, the flux guidance from the tooth 4 to the neighboring teeth 4 via the yoke rear being adversely affected only to a relatively small degree. The bending radius R can be influenced by the depth of the recess 5 and/or by the shape and/or position of the recesses in the yoke rear 7, Notches formed by punching are provided in the tooth head 21 of the teeth 4 for groove closure.

According to brittleness, thickness and degree of incandescence of the material, bending without the recesses 5 according to the invention, similar to a "slinky/helicoil" method, would be conceivable (purely plastic deformation—material flows into different thicknesses).

Figure 4:
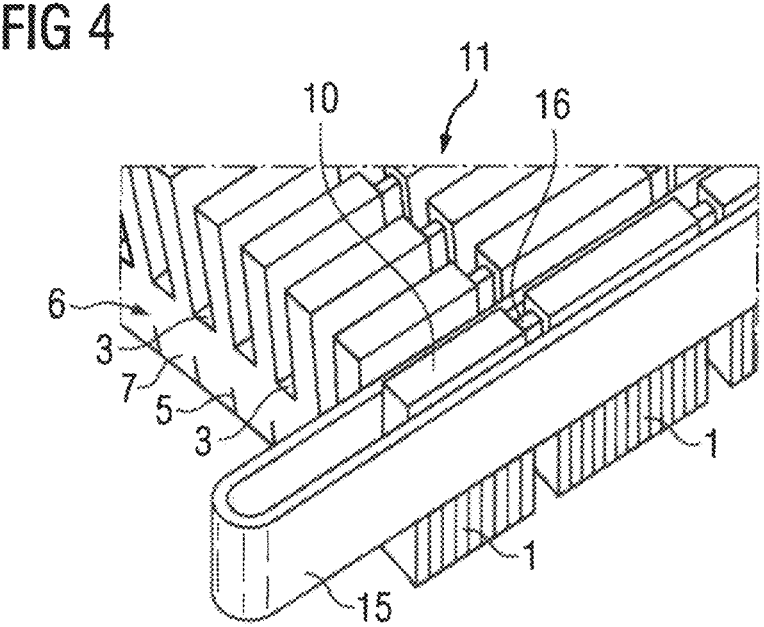
FIG. 4 shows a perspective illustration of a laminated-core segment.

FIG. 4 shows in a partially perspective view a laminated-core segment 11 which is constructed from individual metal sheets 1, wherein the laminated-core segment 11 is subdivided into axial partial laminated cores 10 which, during operation of a dynamo-electric rotary machine, for example of a generator 12, permit additional cooling. The partial laminated cores 10 are axially separated from one another by spacers 16. By way of example, a coil 15 is arranged in a groove 3 of the laminated-core segment 11, Pressure plates stack the laminated-core segments 11.

Figure 5:
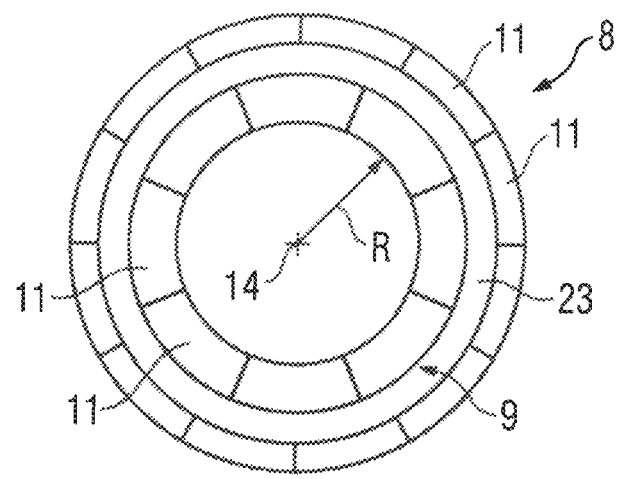
FIG. 5 shows a schematic cross section of a dynamo-electric rotary machine.

FIG. 5 shows in a cross section an exemplary embodiment of a dynamo-electric rotary machine, for example of a generator 12, without winding system, which is configured as an external-rotor machine. A stator 9 is constructed in the circumferential direction from laminated-core segments 11 with a radius R. The individual segments are in this case configured for example as in FIG. 4. The radius R can be configured in a simple manner by way of the recesses 5 in the yoke rear 7. A rotor 8 which is spaced apart from the stator 9 by an air gap 23 and rotates about an axis 14 can likewise be constructed from laminated-core segments 11 according to the invention.

Figure 6:
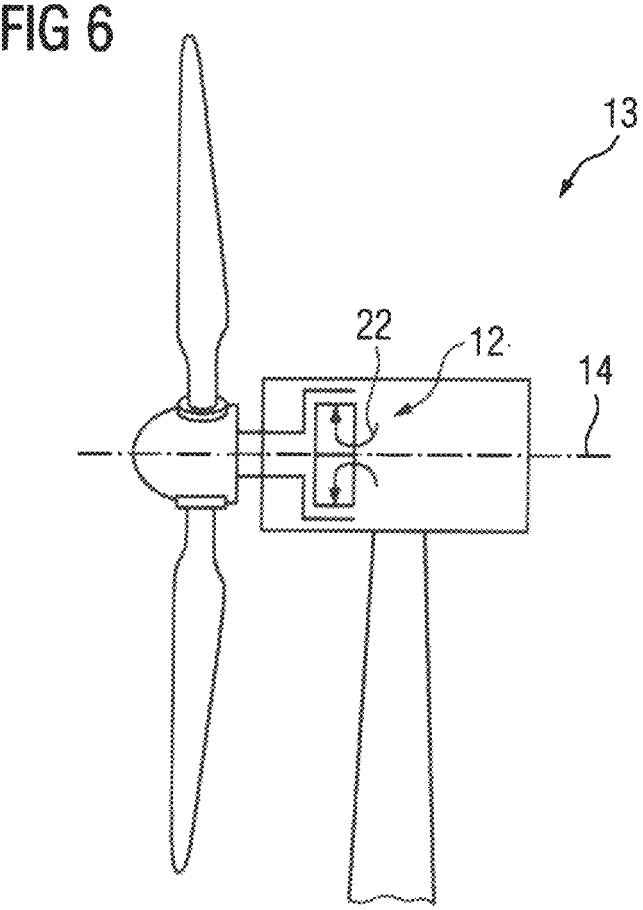
FIG. 6 shows a wind turbine with a generator.

FIG. 6 shows a schematically illustrated wind turbine 13 with a directly driven generator 12, which is configured as an external-rotor machine. In this case, cooling-air streams 22 pass, at the stator 9, into the laminated core via cooling channels.

What is claimed is:

1. A laminated-core segment, comprising a plurality of axially layered, rolled electrical metal sheets, which have been individually separated from one or more sheet-metal coils having a rolling direction, each said metal sheet has a yoke having grooves, teeth and a yoke rear which connects the teeth, wherein the yoke rear in the region of at least some teeth on the side of the metal sheets that faces away from the grooves, has axially aligned recesses extending in the rolling direction, wherein the recesses are arranged at a same level as the teeth and have at least one of a slot shape a wedge shape, a trapezoidal shape, a rectangular shape and a shape of a keyhole notch, wherein delimiting edges of the yoke rear are oriented perpendicularly to the rolling direction and the teeth are oriented in the rolling direction to optimize flux guidance, wherein the laminated-core segments are formed by bending the rolled electrical metal sheets.

2. The laminated-core segment of claim 1, wherein the grooves and the teeth have a same width.

3. The laminated-core segment of claim 1, wherein end-side ones of the teeth delimited by a short side of the metal sheet have, in comparison with remaining ones of the teeth, a width $b_E$ which is smaller than an average width b of the remaining teeth in a circumferential direction, wherein $45\% \leq b_E/b \leq 50\%$.

4. The laminated-core segment of claim 1, wherein end-side ones of the teeth delimited by a short side of the metal sheet have, in comparison with remaining ones of the teeth, a width $b_E$ which is smaller than an average width b of the remaining teeth in a circumferential direction, wherein $47\% \leq b_E/b \leq 49\%$.

5. The laminated-core segment of claim 1, wherein the recesses are provided with respectively assigned ones of the teeth in a common circumferential-angle range.

6. The laminated-core segment of claim 5, wherein the recesses are positioned centrally in relation to the respectively assigned ones of the teeth with respect to a circumferential angle.

7. The laminated-core segment of claim 1, wherein the recesses are each delimited by edges which face toward one another and are bent to provide a curvature of an air gap of an electric machine, with the curvature being solely effected through plastic deformation of the metal sheet.

8. The laminated-core segment of claim 1, wherein the yoke rear is bent in such a way that the recesses are closed or open.

9. A dynamo-electric rotary machine, comprising:
a stator including laminated-core segments which are arranged in a circumferential direction, each said laminated-core segment comprising a plurality of axially layered, rolled electrical metal sheets, which have been Individually separated from one or more sheet-metal coils,
each said metal sheet has a yoke having grooves, teeth and a yoke rear which connects the teeth, wherein the yoke rear in the region of at least some teeth on the side of the metal sheets that faces away from the grooves, has axially aligned recesses extending in a rolling direction of the one or more sheet-metal coils, wherein the recesses are arranged at a same level as the teeth and have at least one of a slot shape a wedge shape, a trapezoidal shape, a rectangular shape and a shape of a keyhole notch, wherein delimiting edges of the yoke rear are oriented perpendicularly to the rolling direction of the one or more sheet-metal coils and the teeth are oriented in the rolling direction to optimize the flux guidance, wherein the laminated-core segments are formed by bending the rolled electrical metal sheets; and
a rotor spaced apart from the stator by an air gap, wherein at least one of the stator and rotor is constructed in a segmented manner in the circumferential direction.

10. The dynamo-electric rotary machine of claim 9, wherein the laminated-core segments delimit the air gap with a defined curvature.

11. A method for producing a laminated-core segment, comprising:
individually separating rolled electrical metal sheets from a sheet-metal coil having a predefined width and a rolling direction such that the metal sheets have a yoke, grooves, teeth and a yoke rear to connect the teeth, and are provided with recesses extending in a longitudinal extent on the yoke rear in a region of at least some of the teeth at a same level as the teeth on a groove-distal side of the metal sheets, with the yoke rear have a delimiting edge extending in perpendicular to the rolling direction of the sheet-metal coil and with the teeth oriented in the rolling direction to optimize flux guidance; and
bending the rolled electrical metal sheets and stacking the rolled electrical metal sheets to form a laminated-core segment in such a way that the recesses of the laminated-core segment are axially aligned so as to allow setting of a curvature of an air gap of an electric machine.

12. The method of claim 11, wherein the metal sheets are punched out or separated by laser from the sheet-metal coil.

13. The method of claim 11, further comprising engaging the teeth into the grooves as the metal sheets are individually separated, with a width of the grooves corresponding to a width of the teeth.

14. The method of claim 11, further comprising during or after stacking of the metal sheets, bending the metal sheets so as to change the recesses for setting the air-gap curvature of the electric machine.

15. The method of claim 14, wherein the recesses open or close as the metal sheets are bent.

16. The method of claim 11, wherein the recesses are formed by punching, in the yoke rear at a height of the teeth.

17. The method of claim 11, wherein the recesses have a slot-shaped configuration.

18. The method of claim 11, wherein, after individual separation, the metal sheets are arranged in a common plane and are spaced apart from one another by way of a relative movement within the common plane.

19. The method of claim 18, wherein the metal sheets are spaced apart from one another along a longitudinal direction of the grooves and/or teeth.

20. The method of claim 11, further comprising assembling the laminated-core segments to form a dynamo-electric rotary machine.

* * * * *